US011724569B2

(12) United States Patent
Takizawa et al.

(10) Patent No.: US 11,724,569 B2
(45) Date of Patent: Aug. 15, 2023

(54) AIR CONDITIONER, AIR CONDITIONING CONTROL METHOD, AND PROGRAM

(71) Applicant: HONDA MOTOR CO., LTD., Tokyo (JP)

(72) Inventors: Kazuaki Takizawa, Wako (JP); Hiroyuki Kurokawa, Wako (JP); Masahito Watanabe, Wako (JP); Kazuhiro Matsuoka, Wako (JP); Akira Saita, Wako (JP); Kazufumi Kuroda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 287 days.

(21) Appl. No.: 16/902,293

(22) Filed: Jun. 16, 2020

(65) Prior Publication Data
US 2021/0008963 A1 Jan. 14, 2021

(30) Foreign Application Priority Data

Jun. 24, 2019 (JP) .................................. 2019-116339

(51) Int. Cl.
B60H 1/00 (2006.01)
H02J 7/00 (2006.01)
(52) U.S. Cl.
CPC ........ B60H 1/00971 (2013.01); H02J 7/0071 (2020.01)
(58) Field of Classification Search
CPC ...... B60H 2001/00228; B60H 1/00278; B60H 1/00971; H02J 7/0071; H02J 7/00
See application file for complete search history.

(56) References Cited

U.S. PATENT DOCUMENTS

| 9,018,895 B2* | 4/2015 | Endo ........................ B60K 6/34 |
| | | 320/132 |
| 2002/0113576 A1* | 8/2002 | Oomura .................... H02J 1/14 |
| | | 320/134 |

(Continued)

FOREIGN PATENT DOCUMENTS

| CN | 102574471 | 7/2012 |
| CN | 104648287 | 5/2015 |

(Continued)

OTHER PUBLICATIONS

Japanese Office Action for Japanese Patent Application No. 2019-116339 dated Feb. 9, 2021.

(Continued)

Primary Examiner — Richard Isla
Assistant Examiner — Sadia Kousar
(74) Attorney, Agent, or Firm — Amin, Turocy & Watson, LLP

(57) ABSTRACT

An air conditioner includes: a secondary battery which is chargeable with electric power supplied from outside of a vehicle and store the electric power for running the vehicle; an air conditioning unit which performs air conditioning in a vehicle interior of the vehicle; a timer for managing a time for operating the air conditioning unit; and a control unit which sets a charging prohibition time period for prohibiting charging of the secondary battery for a time period set by a user. In a case in which electric power is supplied from outside of the vehicle and an operation of the air conditioning unit is set by the timer during the charging prohibition time period, the control unit operates the air conditioning unit using the electric power supplied from outside of the vehicle without charging the secondary battery with the electric power, and in a case in which electric power is supplied from outside of the vehicle and an operation of the air conditioning unit is set by the timer during a time period (Continued)

other than the charging prohibition time period, performs the charging of the secondary battery with the electric power and operates the air conditioning unit using the electric power supplied from outside of the vehicle.

5 Claims, 5 Drawing Sheets

(56) References Cited

U.S. PATENT DOCUMENTS

2012/0022744 A1    1/2012  Endo
2017/0274796 A1    9/2017  Nomura

FOREIGN PATENT DOCUMENTS

| | | | |
|---|---|---|---|
| CN | 107215209 | 9/2017 | |
| DE | 102014222864 | 5/2015 | |
| JP | 2011250672 A * | 12/2011 | ................ B60L 1/00 |
| JP | 2014-121228 | 6/2014 | |
| JP | 5680613 | 3/2015 | |
| JP | 2015-104143 | 6/2015 | |
| JP | 2015-115978 | 6/2015 | |
| JP | 2015104143 A * | 6/2015 | ......... B60H 1/00764 |
| JP | 2015115978 A * | 6/2015 | |
| JP | 2017-175724 | 9/2017 | |

OTHER PUBLICATIONS

Chinese Office Action for Chinese Patent Application No. 202010515379.5 dated Mar. 3, 2023.

* cited by examiner

AIR CONDITIONER, AIR CONDITIONING CONTROL METHOD, AND PROGRAM

CROSS-REFERENCE TO RELATED APPLICATION

Priority is claimed on Japanese Patent Application No. 2019-116339, filed Jun. 24, 2019, the content of which is incorporated herein by reference.

BACKGROUND OF THE INVENTION

Field of the Invention

The present invention relates to an air conditioner, an air conditioning control method, and a program.

Description of Related Art

When charging an electrified vehicle with an external power supply, charging during a time period when electricity rates are low, such as late at night, is advantageous in terms of cost for a user. In this case, the user sets a prohibition time period during which charging is prohibited and sets all the time periods other than the prohibition time period as charging times (see Japanese Patent No. 5680613).

SUMMARY OF THE INVENTION

However, conventional techniques did not consider pre-air conditioning using electric power from outside of a vehicle. Also, pre-air conditioning is the air conditioning in a vehicle being turned on before an occupant gets into the vehicle so that an appropriate environment is obtained when the occupant gets into the vehicle.

Aspects according to the present invention have been made in consideration of such circumstances, and an object of the present invention is to provide an air conditioner, an air conditioning control method, and a program, in which pre-air conditioning using electric power from outside of a vehicle can be controlled even when a prohibition time period during which charging is prohibited is set.

In order to solve the problem described above and achieve the object, the present invention employs the following aspects.

(1) An air conditioner according to one aspect of the present invention includes: a secondary battery which is chargeable with electric power supplied from outside of a vehicle and stores the electric power for running the vehicle; an air conditioning unit which performs air conditioning in a vehicle interior of the vehicle; a timer for managing a time for operating the air conditioning unit; and a control unit which sets a charging prohibition time period for prohibiting charging of the secondary battery for a time period set by a user. In a case in which electric power is supplied from outside of the vehicle and the air conditioning unit is set to operate by the timer during the charging prohibition time period, the control unit operates the air conditioning unit using the electric power supplied from outside of the vehicle without charging the secondary battery with the electric power. In a case in which electric power is supplied from outside of the vehicle and the air conditioning unit is set to operate by the timer during a time period other than the charging prohibition time period, the control unit performs charging of the secondary battery with the electric power and operates the air conditioning unit using the electric power supplied from outside of the vehicle.

(2) In the above aspect (1), in the case in which electric power is supplied from outside of the vehicle and the air conditioning unit is set to operate by the timer during the time period other than the charging prohibition time period, the control unit may give priority to a request for either one of charging the secondary battery or operating the air conditioning unit and supply the electric power supplied from outside of the vehicle preferentially for the one to which the priority is given, and perform the other with the remaining electric power.

(3) In the above aspect (1) or (2), in the case in which electric power is supplied from outside of the vehicle and the air conditioning unit is set to operate by the timer during the time period other than the charging prohibition time period, when the secondary battery reaches a predetermined charging rate, the control unit may stop charging the secondary battery and operate the air conditioning unit.

(4) An air conditioning control method according to one aspect of the present invention is an air conditioning control method for an air conditioner including: a secondary battery which is chargeable with electric power supplied from outside of a vehicle and store the electric power for running the vehicle; an air conditioning unit which performs air conditioning in a vehicle interior of the vehicle; a timer for managing a time for operating the air conditioning unit; and a control unit which sets a charging prohibition time period for prohibiting charging of the secondary battery for a time period set by a user. The air conditioning control method includes: in a case in which electric power is supplied from outside of the vehicle and the air conditioning unit is set to operate by the timer during the charging prohibition time period, operating the air conditioning unit using the electric power supplied from outside of the vehicle without charging the secondary battery with the electric power; and in a case in which electric power is supplied from outside of the vehicle and the air conditioning unit is set to operate by the timer during a time period other than the charging prohibition time period, performing the charging of the secondary battery with the electric power and operating the air conditioning unit using the electric power supplied from outside of the vehicle.

(5) A computer-readable non-transitory storage medium according to one aspect of the present invention stores a program casing a computer of an air conditioner including: a secondary battery which is chargeable with electric power supplied from outside of a vehicle and store the electric power for running the vehicle; an air conditioning unit which performs air conditioning in a vehicle interior of the vehicle; a timer for managing a time for operating the air conditioning unit; and a control unit which sets a charging prohibition time period for prohibiting charging of the secondary battery for a time period set by a user, to execute: in a case in which electric power is supplied from outside of the vehicle and the air conditioning unit is set to operate by the timer during the charging prohibition time period, operating the air conditioning unit using the electric power supplied from outside of the vehicle without charging the secondary battery with the electric power; and in a case in which electric power is supplied from outside of the vehicle and the air conditioning unit is set to operate by the timer during a time period other than the charging prohibition time period, performing charging the secondary battery with the electric power and operates the air conditioning unit using the electric power supplied from outside of the vehicle.

According to the above aspects (1) to (5), even if electric power is supplied from outside of the vehicle when the air conditioning unit is set to operate, charging of the secondary battery and operating of the air conditioning unit are controlled on the basis of whether or not the time period during which the air conditioning unit is set to operate is the charging prohibition time period. As a result, even in the case in which the prohibition time period during which charging is prohibited is set, a confirmation process of the user's intention can be omitted, and pre-air conditioning using the electric power from outside of the vehicle can be controlled.

According to the above aspect (2), since priority is set for air conditioning and charging, the secondary battery can be reliably charged with the remaining electric power while giving priority to the operation of air conditioning. Furthermore, by giving priority to charging the secondary battery, air conditioning can be performed while securely ensuring a cruising distance.

According to the above aspect of (3), when the secondary battery reaches a desired charging rate (charging is completed), the electric power supplied from outside of the vehicle can be supplied to the air conditioning unit and used for air conditioning.

DETAILED DESCRIPTION OF THE INVENTION

Hereinafter, embodiments of an air conditioner, an air conditioning control method, and a program according to the present invention will be described with reference to the drawings.

Configuration Example of Vehicle 10 (Air Conditioner)

Figure 1:
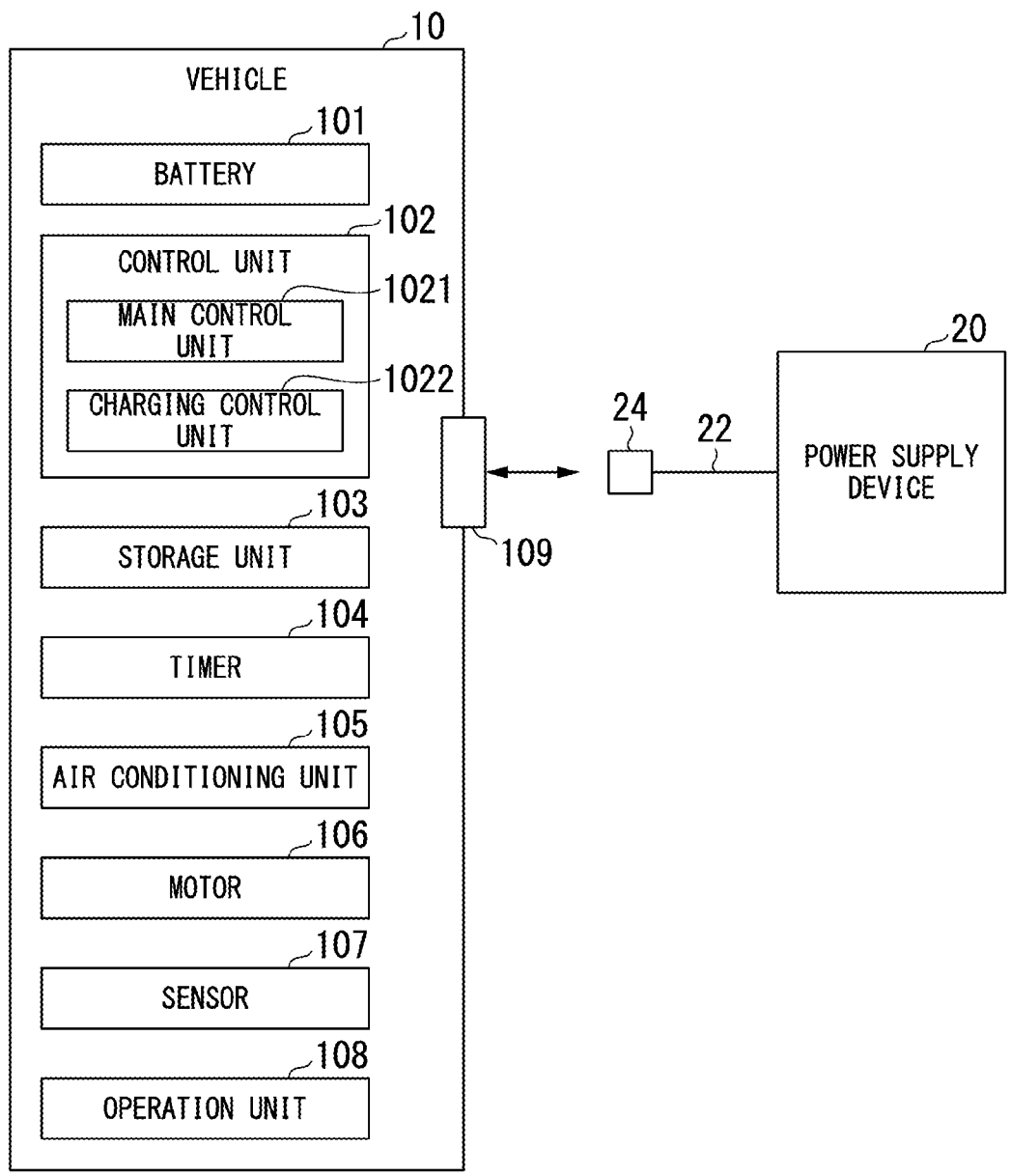
FIG. 1 is a block diagram showing a configuration example of a vehicle (an air conditioner) according to an embodiment.

FIG. 1 is a block diagram showing a configuration example of a vehicle 10 (air conditioner) according to the present embodiment. As shown in FIG. 1, a power supply device 20 is connected to the vehicle 10 (air conditioner) via a cable 22. The cable 22 includes a charging plug 24 connected to the vehicle 10. Further, the vehicle 10 includes a battery 101, a control unit 102, a storage unit 103, a timer 104, an air conditioning unit 105, a motor 106, a sensor 107, an operation unit 108, and a connection unit 109. Also, the control unit 102 includes a main control unit 1021 and a charging control unit 1022.

The power supply device 20 supplies electric power to the vehicle 10 from outside of the vehicle. The power supply device 20 is, for example, a portable power supply device, a portable power storage device, a charging and discharging device grounded to a home or the like, etc.

Although the vehicle 10 is an electric vehicle equipped with a secondary battery or an electric vehicle with a replaceable secondary battery, the vehicle is a vehicle capable of storing electric power from the outside, and may be any vehicle equipped with a secondary battery that supplies electric power for running, and may be a hybrid vehicle or a fuel cell vehicle. Also, the vehicle may be a four-wheeled vehicle, a three-wheeled vehicle, or the like, which includes an air conditioning unit and in which a secondary battery is able to be mounted or replaced. The vehicle 10 performs control of running and air conditioning of the vehicle 10 using electric power stored in the battery 101. When the power supply device 20 is connected to the vehicle 10, the vehicle 10 performs control by determining whether or not to perform air conditioning or to charge the battery 101 using the electric power supplied from the power supply device 20. Also, although not shown, the vehicle 10 includes, for example, an inverter, a transmission, wheels, a brake mechanism, and the like.

The battery 101 is, for example, a secondary battery such as a lithium ion battery. The battery 101 stores electric power supplied from the power supply device 20 under control of the charging control unit 1022 and discharges the stored electric power.

The main control unit 1021 performs control related to settings and air conditioning. The main control unit 1021 sets a charging prohibition time period and a time period other than the charging prohibition time period on the basis of information indicating the charging prohibition time period that is a time period during which charging of the battery 101 included in operation results is prohibited, and causes the storage unit 103 to store the set charging prohibition time period and the time period other than the charging prohibition time period. Also, the main control unit 1021 sets all time periods other than the charging prohibition time period to time periods other than the charging prohibition time period. The main control unit 1021 causes the storage unit 103 to store information indicating a priority included in the operation results. The main control unit 1021 sets a time or a time period for performing pre-air conditioning on the timer 104 on the basis of an instruction for performing the pre-air conditioning included in the operation results. The main control unit 1021 calculates a charging rate of the battery 101 on the basis of a current value or voltage value output from the sensor 107. The main control unit 1021 detects whether or not the charging plug 24 of the power supply device 20 is connected to the vehicle 10 on the basis of, for example, a change in voltage of the connection unit 109. The main control unit 1021 determines whether being a charging prohibition time period or not, whether it is a time period other than the charging prohibition time period or not, whether the pre-air conditioning is set or not, whether the charging plug 24 is connected to the vehicle or not, and whether the priority is set or not. The main control unit 1021 performs control of the air conditioning unit 105 on the basis of the determined results. Also, a determination method performed by the main control unit 1021 and a control method of the air conditioning unit 105 will be described later.

The charging control unit 1022 controls charging of the battery 101 on the basis of the results determined by the main control unit 1021. Further, the method of controlling charging of the battery 101 performed by the charging control unit 1022 will be described later. Also, the charging control unit 1022 may also perform control such as reserved charging in which the charging plug 24 is connected to the vehicle 10 to fully charge it in line with a departure time in the morning (to prevent a fully charging period from becoming long).

The storage unit 103 stores the charging prohibition time period and the time period other than the charging prohibition time period. The storage unit 103 stores the priority. The storage unit 103 stores a threshold for the charging rate of the battery 101. The storage unit 103 stores a program required for controlling the control unit 102.

The timer 104 manages a time for operating the air conditioning unit 105. The timer 104 is used to set the time or time period for operating the air conditioning unit 105 in accordance with control of the main control unit 1021. The timer 104 may also be used to set a time period for charging the battery 101 in accordance with control of the main control unit 1021.

The air conditioning unit 105 performs air conditioning for an inside of the vehicle 10 using the electric power supplied from the power supply device 20 or the electric power stored in the battery 101 in accordance with control of the main control unit 1021. Also, the air conditioning includes pre-air conditioning for operating air conditioning for a predetermined time before an occupant gets on the vehicle, and air conditioning performed when the occupant is in the vehicle.

The motor 106 rotates wheels using the electric power supplied from the battery 101 in accordance with control of the main control unit 1021.

The sensor 107 includes, for example, a current sensor that detects a current flowing through the battery 101 and a voltage sensor that detects a voltage of the battery 101. The sensor 107 outputs a detected value to the main control unit 1021.

The operation unit 108 detects operation results due to an operation by the user and outputs the detected operation results to the main control unit 1021. The operation results include information indicating the charging prohibition time period, information indicating the priority, an instruction to perform pre-air conditioning, and the like. The operation unit 108 may be a button switch or the like included in a dashboard in the vehicle 10. Alternatively, the operation unit 108 may be a remote controller or the like connected to the vehicle 10 by wire or wirelessly.

The connection unit 109 is connected to the charging plug 24 of the cable 22. Also, the connection between the connection unit 109 and the charging plug 24 may be a connection through a contact or non-contact connection. Further, in the case of non-contact connection, the electric power from the power supply device 20 is supplied to the vehicle 10 in a non-contact manner.

In addition, the control unit 102 is realized by a hardware processor such as an electronic control unit (ECU), a central processing unit (CPU), or the like executing a program (software). A part or the whole of the control unit 102 may be realized by hardware (a circuit unit; including circuitry) such as a large scale integration (LSI), an application specific integrated circuit (ASIC), a field programmable gate array (FPGA), or a graphics processing unit (GPU), or may be realized by software in cooperation with hardware. The program may be stored in a storage device (a storage device including a non-transitory storage medium) such as a hard disk drive (HDD) or a flash memory in advance, or may be stored in a removable storage medium (non-transitory storage medium) such as a DVD or a CD-ROM and installed by mounting the storage medium on a drive device.

First Embodiment

In a first embodiment, in the case in which an operation of the pre-air conditioning is set and the charging plug 24 is connected during the charging prohibition time period, the air conditioning unit 105 is operated using the electric power from the power supply device 20 without charging the battery 101 with the electric power from the power supply device 20. In addition, in the first embodiment, in the case in which the operation of the pre-air conditioning is set and the charging plug 24 is connected during the time period other than the charging prohibition time period, charging of the battery 101 and operating of the air conditioning unit 105 is performed using the electric power from the power supply device 20.

Figure 2:
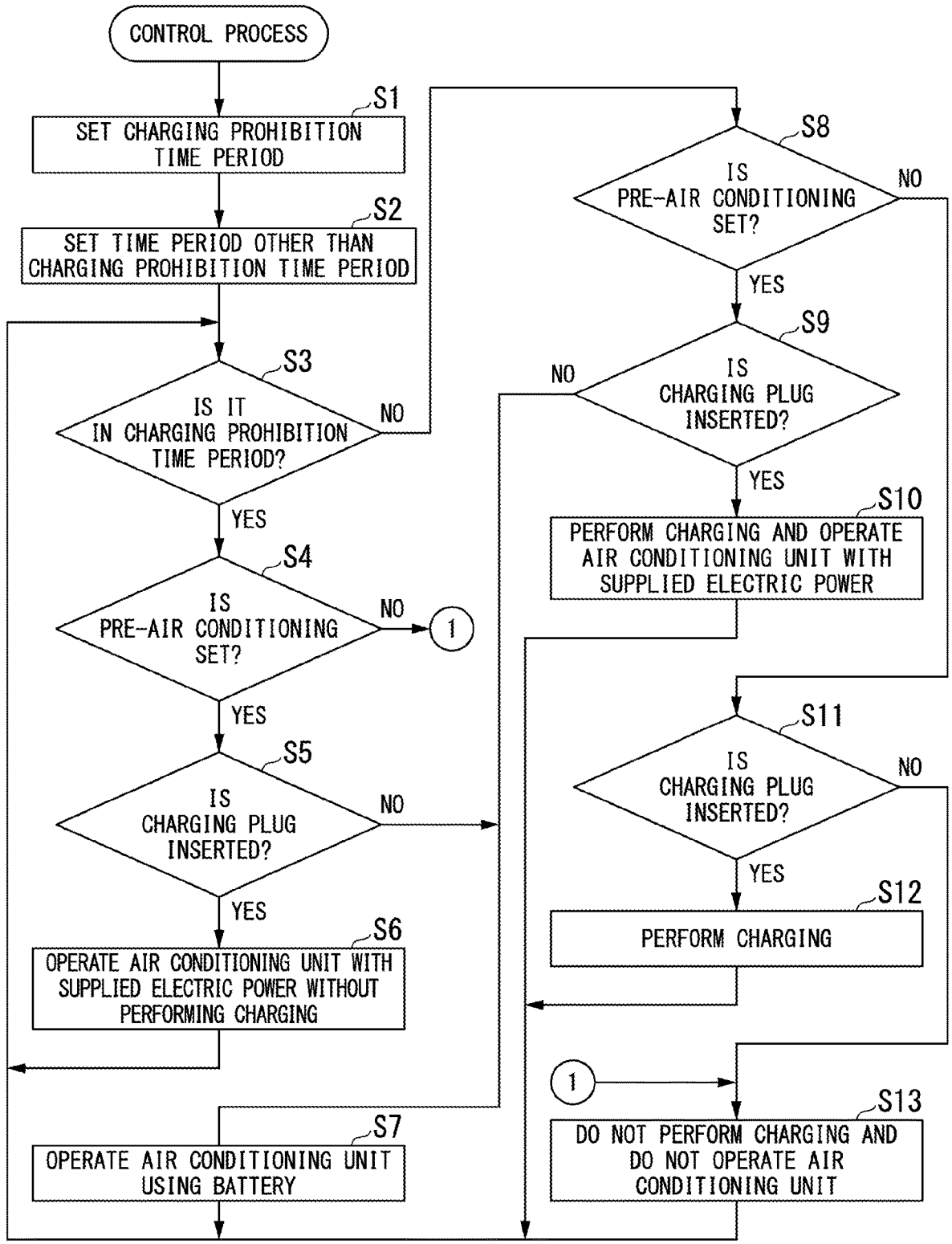
FIG. 2 is a flowchart showing an example of a control procedure according to a first embodiment.

FIG. 2 is a flowchart showing an example of a control procedure according to the first embodiment.

The main control unit 1021 sets the charging prohibition time period on the basis of an operation result of the user operating the operation unit 108 (step S1). Subsequently, the main control unit 1021 sets the time period other than the charging prohibition time period on the basis of the charging prohibition time period (step S2).

The main control unit 1021 determines whether or not the current time is included in the charging prohibition time period (step S3).

In the case in which the current time is included in the charging prohibition time period (YES in step S3), the main control unit 1021 determines whether or not the operation of the pre-air conditioning is set on the basis of an operation of the timer 104 (step S4).

In the case in which the current time is included in the charging prohibition time period and the operation of the pre-air conditioning is set (YES in step S3 and YES in step S4), the main control unit 1021 determines whether or not the charging plug is connected to the vehicle (step S5).

In the case in which the current time is included in the charging prohibition time period, the operation of the pre-air conditioning is set, and the charging plug 24 is connected to the vehicle (YES in step S5), the charging control unit 1022 does not perform charging of the battery 101 with the electric power from the power supply device 20. Subsequently, in the case in which the current time is included in the charging prohibition time period, the operation of the pre-air conditioning is set, and the charging plug 24 is connected to the vehicle (YES in step S5), the main control unit 1021 operates the air conditioning unit 105 with the electric power from the power supply device 20 to perform the pre-air conditioning (step S6). The main control unit 1021 returns the process to step S3.

In the case in which the current time is included in the charging prohibition time period, the operation of the pre-air conditioning is set, and the charging plug 24 is not connected to the vehicle (NO in step S5 or NO in step S9), the main control unit 1021 operates the air conditioning unit 105 with the electric power stored in the battery 101 to perform the pre-air conditioning (step S7). The main control unit 1021 returns the process to step S3.

In the case in which the current time is the time period other than the charging prohibition time period (NO in step S3), the main control unit 1021 determines whether or not the operation of the pre-air conditioning is set on the basis of the operation of the timer 104 (step S8).

In the case in which the current time is the time period other than the charging prohibition time period and the operation of the pre-air conditioning is set (NO in step S3 and YES in step S8), the main control unit 1021 determines whether or not the charging plug 24 is connected to the vehicle (step S9).

In the case in which the current time is the time period other than the charging prohibition time period, the operation of the pre-air conditioning is set, and the charging plug 24 is connected to the vehicle (YES in step S9), the charging control unit 1022 performs charging of the battery 101 with the electric power from the power supply device 20. Subsequently, in the case in which the current time is the time period other than the charging prohibition time period, the operation of the pre-air conditioning is set, and the charging plug 24 is connected to the vehicle (YES in step S9), the main control unit 1021 operates the air conditioning unit 105 with the electric power from the power supply device 20 to perform the pre-air conditioning (step S10). The main control unit 1021 returns the process to step S3.

In the case in which the current time is the time period other than the charging prohibition time period and the operation of the pre-air conditioning is not set (NO in step S3 and NO in step S8), the main control unit 1021 determines whether or not the charging plug 24 is connected to the vehicle (step S11).

In the case in which the current time is the time period other than the charging prohibition time period, the operation of the pre-air conditioning is not set, and the charging plug 24 is connected to the vehicle (YES in step S11), the charging control unit 1022 performs charging of the battery 101 with the electric power from the power supply device 20. Subsequently, the main control unit 1021 does not perform the pre-air conditioning without operating the air conditioning unit 105 (step S12). The main control unit 1021 returns the process to step S3.

In the case in which the current time is included in the charging prohibition time period and the operation of the pre-air conditioning is not set (YES in step S3 and NO in step S4), the charging control unit 1022 does not perform charging of the battery 101 with the electric power from the power supply device 20. Subsequently, in the case in which the current time is included in the charging prohibition time period and the operation of the pre-air conditioning is not set (YES in step S3 and NO in step S4), the main control unit 1021 does not perform the pre-air conditioning without operating the air conditioning unit 105. Alternatively, in the case in which the current time is the time period other than the charging prohibition time period, the operation of the pre-air conditioning is not set, and the charging plug 24 is not connected to the vehicle (NO in step S11), the charging control unit 1022 does not perform charging of the battery 101 with the electric power from the power supply device 20. Subsequently, in the case in which the current time is the time period other than the charging prohibition time period, the operation of the pre-air conditioning is not set, and the charging plug 24 is not connected to the vehicle (NO in step S11), the main control unit 1021 does not perform the pre-air conditioning without operating the air conditioning unit 105 (step S13). The main control unit 1021 returns the process to step S3.

Also, the process procedure shown in FIG. 2 is an example, and the present invention is not limited thereto. For example, in the procedure of steps S3, S4, and S5, the control unit 102 may perform the process of step S5 first, or may perform these processes simultaneously.

Figure 3:
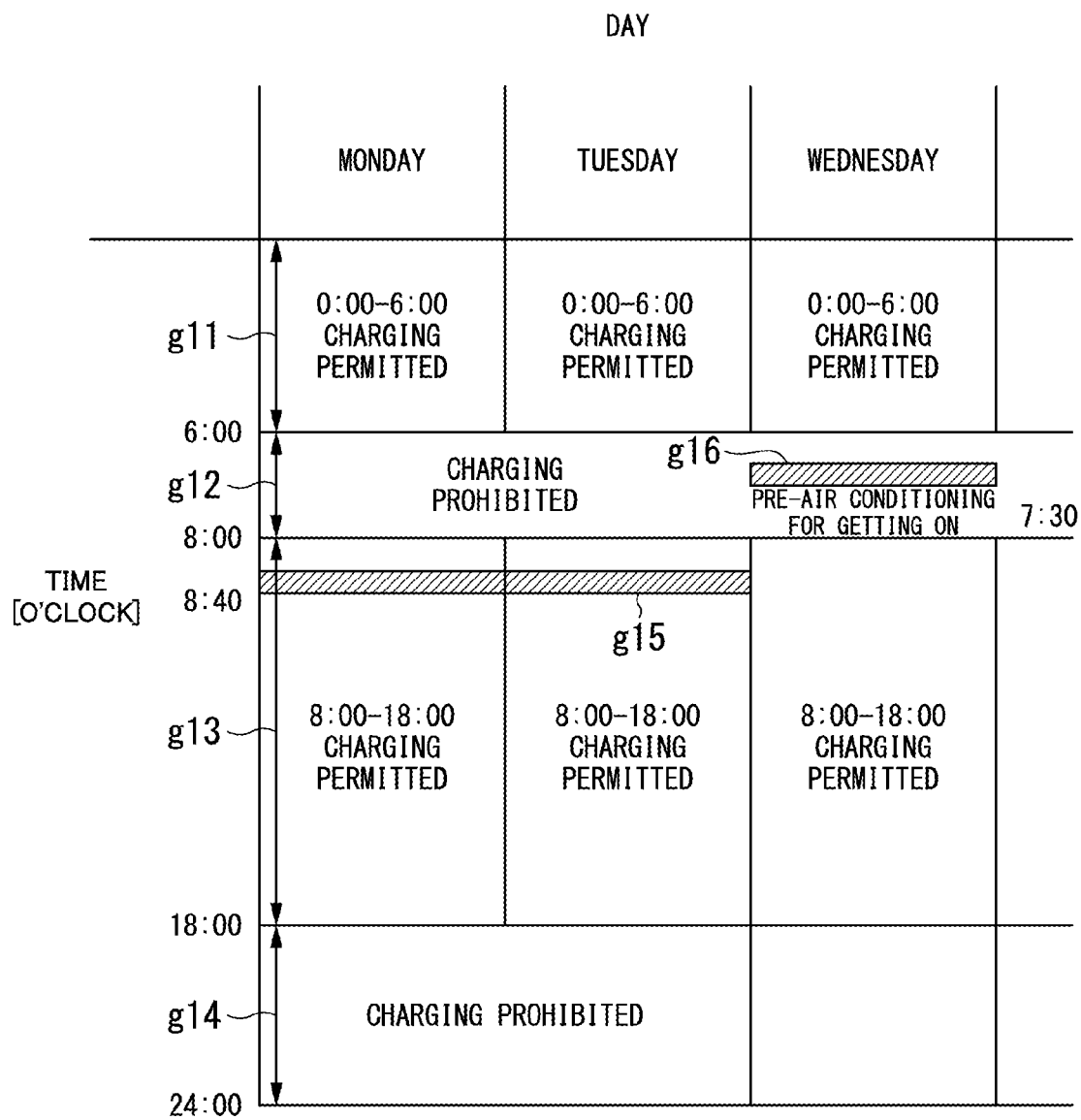
FIG. 3 is a diagram showing an example of setting of a timer for operating pre-air conditioning or the like other than a charging prohibition time period, and the charging prohibition time period according to the first embodiment.

Next, an example of setting of the timer 104 for operating the pre-air conditioning during the charging prohibition time period and the time period other than the charging prohibition time period will be described. FIG. 3 is a diagram showing an example of setting the timer 104 or the like for operating the pre-air conditioning during the charging prohibition time period and the time period other than the charging prohibition time period in the present embodiment.

In FIG. 3, items in a horizontal direction are days of a week, and items in a vertical direction are time. In an example shown in FIG. 3, as indicated by reference numerals g12 and g14, the charging prohibition time period for prohibiting charging is set for a time period from 6:00 to 8:00 and a time period from 18:00 to 24:00. In addition, as indicated by reference numerals g11 and g13, a time period other than the charging prohibition time period, that is, a time period during which charging is permitted is set for a time period from 0:00 to 6:00 and a time period from 8:00 to 18:00. Further, as indicated by reference numeral g15, the operation of the pre-air conditioning is set at 8:40 on Monday and Tuesday. Also, as indicated by reference numeral g16, the operation of the pre-air conditioning is set at 7:30 on Wednesday. Also, in the example shown in FIG. 3, the charging prohibition time period is set for the same time period for Monday, Tuesday, and Wednesday, but this setting may be for each day of the week, the weekdays, the weekend, or the like. Also, the pre-air conditioning is performed for a predetermined time, for example, 30 minutes.

In the example shown in FIG. 3, control performed by the control unit 102 when the charging plug 24 is connected will be described. When the charging plug 24 is connected during the time period from 0:00 to 6:00 other than the charging prohibition time period on Monday, the charging control unit 1022 performs charging of the battery 101 with the electric power from the power supply device 20. Since the operation of the pre-air conditioning has not been set for this time period, the main control unit 1021 does not perform the pre-air conditioning.

In the case in which the charging plug 24 is connected during the time period from 6:00 to 8:00 of the charging prohibition time period on Monday, the charging control unit 1022 does not perform charging of the battery 101 with the electric power from the power supply device 20. Since the operation of the pre-air conditioning has not been set in this time period, the main control unit 1021 does not perform the pre-air conditioning.

In the case in which the charging plug 24 is connected during the time period from 8:00 to 18:00 other than the charging prohibition time period on Monday, the charging control unit 1022 performs charging of the battery 101 with the electric power from the power supply device 20. Then, the main control unit 1021 performs the pre-air conditioning with the electric power from the power supply device 20 for a predetermined time from 8:40 at which the operation of the pre-air conditioning is set.

In the case in which the charging plug 24 is connected during the time period from 6:00 to 8:00 of the charging prohibition time period on Wednesday, the charging control unit 1022 does not perform charging of the battery 101 with the electric power from the power supply device 20. Then, the main control unit 1021 performs the pre-air conditioning with the electric power from the power supply device 20 for a predetermined time from 7:30 at which the operation of the pre-air conditioning is set.

Also, in the example described above, the time and time period for performing the pre-air conditioning may be the time when the user operates the operation unit 108 to set the operation of the pre-air conditioning. Alternatively, the time and time period for performing the pre-air conditioning may be the time and time period set by the user operating the operation unit 108 to set the operation of the pre-air conditioning.

As described above, in the present embodiment, the user sets the charging prohibition time period and sets the time for performing the pre-air conditioning. In addition, in the present embodiment, on the basis of these set information and whether or not the charging plug 24 is connected, the main control unit 1021 controls the pre-air conditioning (control of the air conditioning unit 105), and the charging control unit 1022 controls the charging of the battery 101.

Here, assuming the case of setting a time period during which charging is permitted, when the charging plug 24 is connected to the vehicle 10, it is necessary to confirm with the user whether to charge the battery at the set time period or to ignore the setting and start charging immediately.

In contrast to this, as in the present embodiment, by setting the time period in which charging is prohibited and setting all other time periods as time periods in which charging is not prohibited, the process of confirming the user's intention when the user connects the charging plug 24 to the vehicle 10 can be omitted. Further, in the present embodiment, in consideration of the charging prohibition time period, the pre-air conditioning can be performed using the electric power supplied from the power supply device 20 while the process of confirming the user's intention whether or not to charge is omitted.

Second Embodiment

In a second embodiment, in the case in which the operation of the pre-air conditioning is set and the charging plug 24 is connected during a time period other than the charging prohibition time period, the electric power supplied from the power supply device 20 is supplied to the air conditioning unit 105 or used for charging the battery 101 on the basis of the priority.

Figure 4:
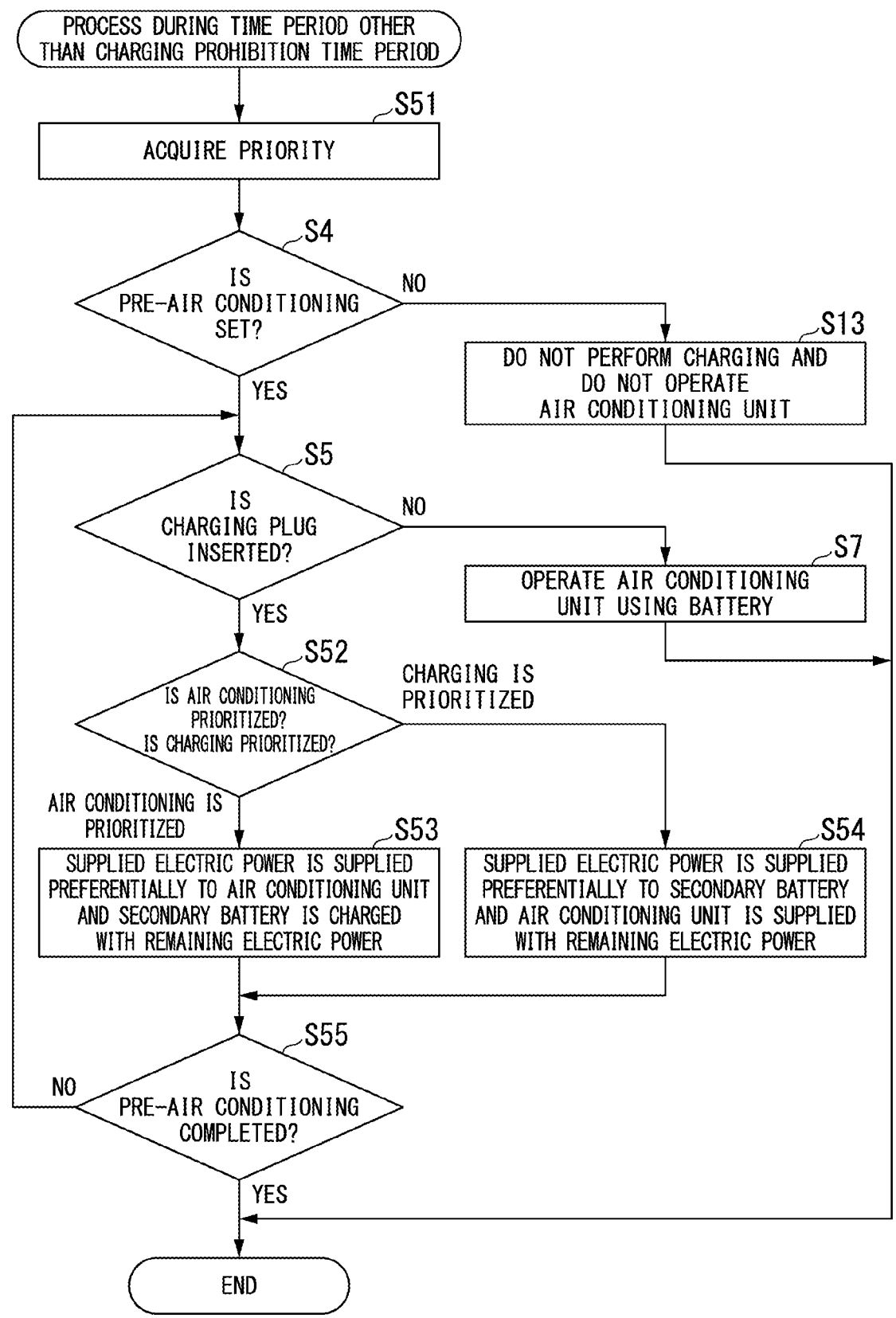
FIG. 4 is a flowchart showing an example of a control procedure according to a second embodiment.

FIG. 4 is a flowchart showing an example of a control procedure according to the second embodiment. Also, processes the same as those in the first embodiment are denoted by the same reference numerals, and descriptions thereof will be omitted.

The control unit 102 performs the processes of steps 51 to S3 (FIG. 2). Also, when the current time is in a time period other than the charging prohibition time period, the control unit 102 performs the processes of steps S8 to S13 (FIG. 2).

In the case in which the current time is included in the time period other than the charging prohibition time period, the main control unit 1021, acquires the priority on the basis of operation results of the user operating the operation unit 108 (step S51). Further, the priority includes information indicating whether the electric power supplied from the power supply device 20 is preferentially supplied to the air conditioning unit 105 (priority is given to air conditioning) or used to charge the battery 101 (priority is given to charging). After the process of step S51, the main control unit 1021 performs the processes of steps S4 and S5.

In the case in which the operation of the pre-air conditioning is set and the charging plug 24 is connected to the vehicle (YES in step S5), the main control unit 1021 determines whether the priority is given to the air conditioning or to the charging (step S52).

In the case in which the priority is given to the air conditioning (the air conditioning is prioritized in step S52), the main control unit 1021 performs the pre-air conditioning by preferentially supplying the electric power supplied from the power supply device 20 to the air conditioning unit 105. Subsequently, in the case in which the priority is given to the air conditioning (the air conditioning is prioritized in step S52), the charging control unit 1022 charges the battery 101 with the remaining electric power (step S53). The control unit 102 proceeds with the process to step S55.

In the case in which the priority is given to the charging (the charging is prioritized in step S52), the charging control unit 1022 uses the electric power supplied from the power supply device 20 preferentially for charging the battery 101.

Subsequently, in the case in which the priority is given to the charging (the charging is prioritized in step S52), the main control unit 1021 supplies the remaining electric power to the air conditioning unit 105 to perform the pre-air conditioning (step S54). The control unit 102 proceeds with the process to step S55.

The main control unit 1021 determines whether or not the pre-air conditioning has been completed (step S55). Further, in the case in which it is determined that the operation of pre-air conditioning has been performed for a predetermined time (YES in step S55), the main control unit 1021 ends the pre-air conditioning. In the case in which it is determined that the operation of pre-air conditioning has not been performed for a predetermined time (NO in step S55), the main control unit 1021 returns the process to step S5.

The control unit 102 performs the processes of steps S7 and S13 as in the first embodiment.

As described above, in the present embodiment, the user sets the charging prohibition time period, and sets the time for performing the pre-air conditioning and the priority. In addition, in the present embodiment, on the basis of the set information and whether or not the charging plug 24 is connected, the main control unit 1021 preferentially performs either one of supplying the electric power to the air conditioning unit 105 or supplying the electric power to the battery 101 in the time period other than the charging prohibition time period.

Thus, according to the present embodiment, the battery 101 can be reliably charged with the remaining electric power while the pre-air conditioning is prioritized, for example. Alternatively, according to the present embodiment, the pre-air conditioning can be performed while a cruising distance is securely ensured by giving priority to the charging of the battery 101.

Third Embodiment

In a third embodiment, in the case in which the operation of the pre-air conditioning is set and the charging plug 24 is connected during a time period other than the charging prohibition time period, the electric power supplied from the power supply device 20 is supplied to the battery 101 and the air conditioning unit 105. In addition, in the third embodiment, when the charging rate of the battery 101 reaches a predetermined value, the supply of the electric power to the battery 101 is stopped and the electric power is supplied to the air conditioning unit 105.

Figure 5:
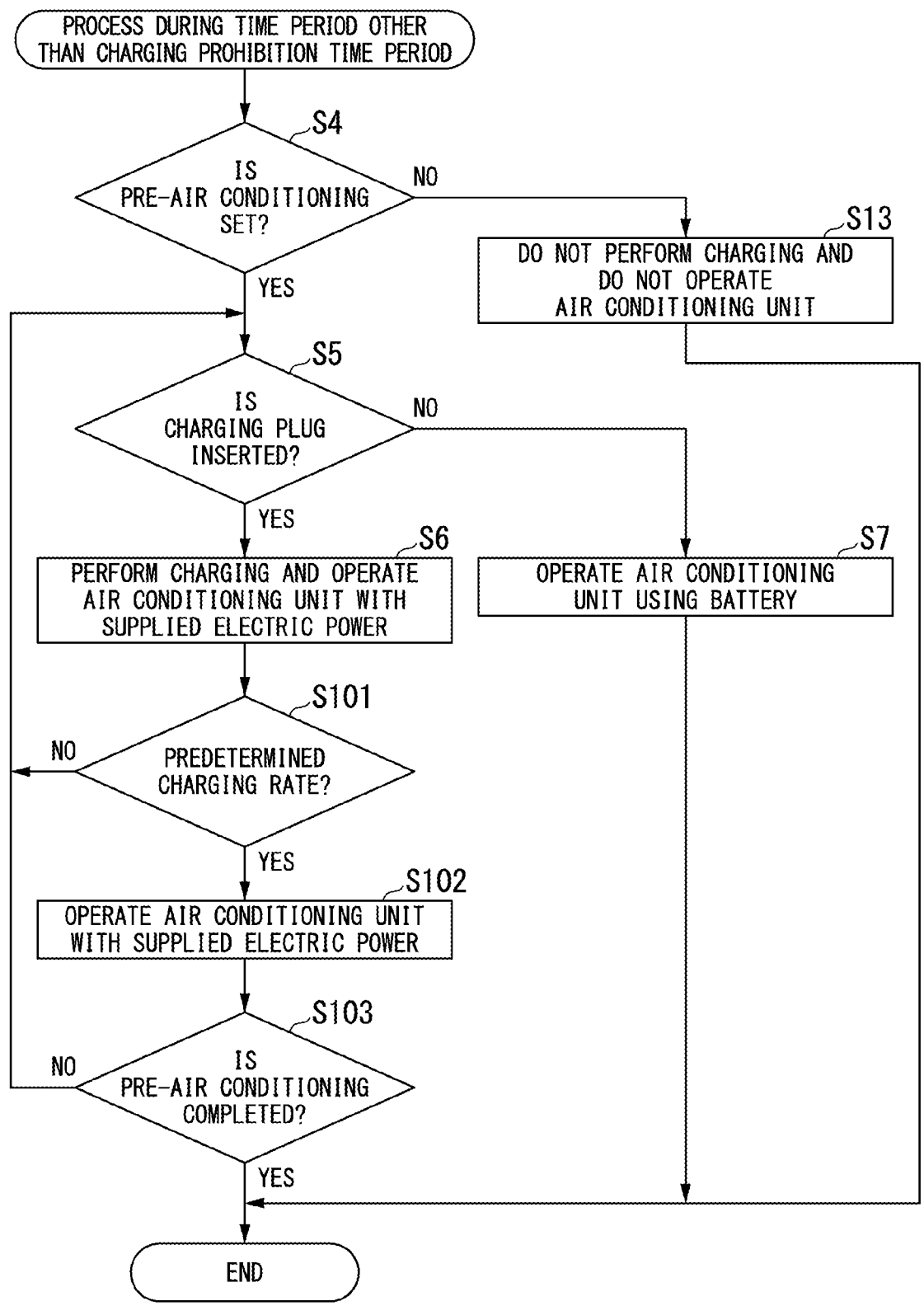
FIG. 5 is a flowchart showing an example of a control procedure according to a third embodiment.

FIG. 5 is a flowchart showing an example of a control procedure according to the third embodiment. Also, the same processes as those in the first embodiment are denoted by the same reference numerals, and descriptions thereof will be omitted.

The control unit 102 performs the processes of steps S1 to S3 (FIG. 2). In the case in which the current time is in a time period other than the charging prohibition time period, the control unit 102 performs the processes of steps S8 to S13 (FIG. 2). Subsequently, the control unit 102 performs the processes of steps S4 to S6.

The charging control unit 1022 calculates the charging rate of the battery 101 using a current value and a voltage value output by the sensor 107. Subsequently, the charging control unit 1022 determines whether the calculated charging rate is equal to or greater than a threshold stored in the storage unit 103 (step S101).

In the case in which the charging rate is determined to be less than the threshold (NO in step S101), the charging control unit 1022 returns the process to step S5.

In the case in which the charging rate is determined to be equal to or higher than the threshold (YES in step S101), the charging control unit 1022 stops using the electric power supplied from the power supply device 20 in charging the battery 101, and supplies the electric power to the air conditioning unit 105 to operate the pre-air conditioning.

The main control unit 1021 determines whether or not the pre-air conditioning has been completed (step S103). Further, in the case in which it is determined that the pre-air conditioning operation has been performed for a predetermined time (YES in step S103), the main control unit 1021 ends the pre-air conditioning. In the case in which it is determined that the pre-air conditioning operation has not been performed for a predetermined time (NO in step S103), the main control unit 1021 returns the process to step S5.

The control unit 102 performs the processes of steps S7 and S13 as in the first embodiment.

As described above, in the present embodiment, the user sets the charging prohibition time period and sets the time for performing the pre-air conditioning. In addition, the control unit 102 gives priority to the charging of the battery 101 in the time period other than the charging prohibition time period on the basis of the set information and whether or not the charging plug 24 is connected, and when the charging rate of the battery 101 reaches or exceeds a predetermined charging rate, ends the charging of the battery 101 and performs the pre-air conditioning with the electric power supplied from the power supply device 20.

Thus, according to the present embodiment, when the secondary battery reaches a desired charging rate (the charging is completed), the electric power supplied from the power supply device 20 can be supplied to the air conditioning unit 105 and used for the pre-air conditioning.

Also, although an example in which the priority is not used has been described in the third embodiment, the priority may be used in the third embodiment. For example, the example shown in FIG. 5 is a case in which the charging is prioritized. In this case, the control unit 102 may preferentially supply the electric power to the battery 101 first, and supply the remaining electric power to the air conditioning unit 105 to perform the pre-air conditioning. In addition, when the charging rate of the battery 101 is determined to be equal to or higher than the threshold, the control unit 102 may stop supplying the electric power from the power supply device 20 to the battery 101 and supply the electric power from the power supply device 20 to the air conditioning unit 105.

When the priority is given to the air conditioning, the control unit 102 may preferentially supply the electric power to the air conditioning unit 105 first, and supply the remaining electric power to the battery 101 to perform the charging. When it is determined that the pre-air conditioning has been performed for a predetermined time, the control unit 102 may stop supplying the electric power from the power supply device 20 to the air conditioning unit 105 and use the electric power from the power supply device 20 to charge the battery 101.

As described above, according to each embodiment described above, the pre-air conditioning can be performed by using the electric power supplied from the power supply device 20 while the process of confirming the user's intention to charge the battery 101 is omitted so that no burden is imposed on the user.

While aspects for implementing the present invention has been described using the embodiments as described above, the present invention is not limited to such embodiments at all, and various modifications and substitutions can be made without departing from the gist of the present invention.

What is claimed is:

1. An air conditioner comprising:
   a secondary battery which is chargeable with electric power supplied from outside of a vehicle and stores the electric power for running the vehicle;
   an air conditioning unit which performs air conditioning in a vehicle interior of the vehicle;
   a timer for managing a time for operating the air conditioning unit; and
   a control unit which sets a charging prohibition time period for prohibiting charging of the secondary battery for a time period set by a user, wherein,
   in a case in which electric power is supplied from outside of the vehicle and an operation of the air conditioning unit is set by the timer during the charging prohibition time period, the control unit operates the air conditioning unit using the electric power supplied from outside of the vehicle without charging the secondary battery with the electric power, and
   in a case in which electric power is supplied from outside of the vehicle and an operation of the air conditioning unit is set by the timer during a time period other than the charging prohibition time period, the control unit performs the charging of the secondary battery with the electric power and operates the air conditioning unit using the electric power supplied from outside of the vehicle.

2. The air conditioner according to claim 1, wherein, in the case in which electric power is supplied from outside of the vehicle and the operation of the air conditioning unit is set by the timer during the time period other than the charging prohibition time period, the control unit gives priority to a request for either one of charging the secondary battery or operating the air conditioning unit to supply the electric power supplied from outside of the vehicle preferentially to for the one to which the priority is given, and performs the other with remaining electric power.

3. The air conditioner according to claim 1, wherein, in the case in which electric power is supplied from outside of the vehicle and the operation of the air conditioning unit is set by the timer during the time period other than the charging prohibition time period, when the secondary battery reaches a predetermined charging rate, the control unit stops charging the secondary battery and operates the air conditioning unit.

4. An air conditioning control method for an air conditioner which includes:
   a secondary battery which is chargeable with electric power supplied from outside of a vehicle and stores the electric power for running the vehicle; an air conditioning unit which performs air conditioning in a vehicle interior of the vehicle; a timer for managing a time for operating the air conditioning unit; and a control unit which sets a charging prohibition time period for prohibiting charging of the secondary battery for a time period set by a user, the method comprising:
   in a case in which electric power is supplied from outside of the vehicle and an operation of the air conditioning unit is set by the timer during the charging prohibition time period, operating the air conditioning unit using the electric power supplied from outside of the vehicle without charging the secondary battery with the electric power; and in a case in which electric power is supplied from outside of the vehicle and an operation of the air conditioning unit is set by the timer during a time period other than the charging prohibition time period, performing the charging of the secondary battery with the electric power and operating the air conditioning unit using the electric power supplied from outside of the vehicle.

5. A computer-readable non-transitory storage medium storing a program causing a computer of an air conditioner which includes: a secondary battery which is chargeable with electric power supplied from outside of a vehicle and stores the electric power for running the vehicle; an air conditioning unit which performs air conditioning in a vehicle interior of the vehicle; a timer for managing a time for operating the air conditioning unit; and a control unit which sets a charging prohibition time period for prohibiting charging of the secondary battery for a time period set by a user, to execute:

in a case in which electric power is supplied from outside of the vehicle and an operation of the air conditioning unit is set by the timer during the charging prohibition time period, operating the air conditioning unit using the electric power supplied from outside of the vehicle without charging the secondary battery with the electric power; and in a case in which electric power is supplied from outside of the vehicle and an operation of the air conditioning unit is set by the timer during a time period other than the charging prohibition time period, performing the charging of the secondary battery with the electric power and operating the air conditioning unit using the electric power supplied from outside of the vehicle.

* * * * *